US012651528B1

(12) United States Patent
Littlejohn et al.

(10) Patent No.: US 12,651,528 B1
(45) **Date of Patent: *Jun. 9, 2026**

(54) SELECTIVE INCLUSION OF DATA IN TRANSPORT PROTOCOL EXPERT GROUP FRAMES

(71) Applicant: iHeart Media Management Services, Inc., San Antonio, TX (US)

(72) Inventors: Jeffrey Lee Littlejohn, Cincinnati, OH (US); Charles Kirkendall, Cincinnati, OH (US); Amit Deshpande, Cincinnati, OH (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 10 days.

This patent is subject to a terminal disclaimer.

(21) Appl. No.: 18/780,578

(22) Filed: Jul. 23, 2024

Related U.S. Application Data

(63) Continuation of application No. 18/217,700, filed on Jul. 3, 2023, now Pat. No. 12,073,713, which is a (Continued)

(51) Int. Cl.
*G01C 25/00* (2006.01)
*G08G 1/01* (2006.01)
*G08G 1/09* (2006.01)

(52) U.S. Cl.
CPC ........... *G08G 1/0125* (2013.01); *G08G 1/091* (2013.01)

(58) Field of Classification Search
CPC ... G08G 1/0125; G08G 1/091; B60W 60/001; B60W 50/00; G01S 7/497; G01S 17/931; G01C 25/00; G01C 21/28; G05B 9/02
See application file for complete search history.

(56) References Cited

U.S. PATENT DOCUMENTS 6,990,407 B1 1/2006 Mbekeani et al.
7,031,983 B2 * 4/2006 Israni ................. G01C 21/3492 707/999.104

(Continued)

OTHER PUBLICATIONS

Schneebauer et al., On-The-Fly Location Referencing Methods for Establishing Traffic Information Services, 2007, IEEE, p. 1-8 (Year: 2007).*

(Continued)

*Primary Examiner* — Mcdieunel Marc
(74) *Attorney, Agent, or Firm* — Edward J. Marshall

(57) ABSTRACT

A method includes establishing a primary bounding area corresponding to a first geographic broadcast area of a traffic message, the primary bounding area associated with a first set of road classes; establishing a first sub-bounding area nested within the primary bounding area, the first sub-bounding area corresponding to a second geographic area smaller than the first geographic broadcast area, and being associated with a second set of road classes different than the first set of road classes. A traffic message associated with a road having an assigned road class is received, and the traffic message is inserted into a Transport Protocol Experts Group frame transmitted within the first sub-bounding area in response to determining that the road and the assigned road class are associated with either the first sub-bounding area or the primary bounding area.

20 Claims, 5 Drawing Sheets

Related U.S. Application Data continuation of application No. 17/492,762, filed on Oct. 4, 2021, now Pat. No. 11,735,036, which is a continuation of application No. 16/819,312, filed on Mar. 16, 2020, now Pat. No. 11,138,871, which is a continuation of application No. 16/288,822, filed on Feb. 28, 2019, now Pat. No. 10,692,366, which is a continuation of application No. 16/110,539, filed on Aug. 23, 2018, now Pat. No. 10,255,802, which is a continuation of application No. 15/917,934, filed on Mar. 12, 2018, now Pat. No. 10,089,866, which is a continuation of application No. 15/162,951, filed on May 24, 2016, now Pat. No. 9,916,756.

(56) References Cited

U.S. PATENT DOCUMENTS

| | | | | |
|---|---|---|---|---|
| 7,139,659 | B2 | 11/2006 | Mbekeani et al. | |
| 7,251,558 | B1 | 7/2007 | McGrath | |
| 7,269,503 | B2 | 9/2007 | McGrath | |
| 7,307,513 | B2 | 12/2007 | Shutter et al. | |
| 7,403,537 | B2 | 7/2008 | Allison et al. | |
| 7,640,015 | B2 | 12/2009 | Connelly et al. | |
| 9,026,346 | B2 | 5/2015 | Choi | |
| 9,116,917 | B1 * | 8/2015 | Ekwall | G06F 16/29 |
| 9,177,471 | B2 | 11/2015 | Hinz | |
| 9,251,703 | B1 * | 2/2016 | Mbekeani | G08G 1/092 |
| 9,401,100 | B2 * | 7/2016 | Forsblom | G06F 16/248 |
| 9,903,635 | B2 | 2/2018 | Eicher et al. | |
| 9,916,756 | B2 | 3/2018 | Littlejohn et al. | |
| 9,997,069 | B2 | 6/2018 | Bennett et al. | |
| 9,998,434 | B2 | 6/2018 | Verzun et al. | |
| 10,089,866 | B2 | 10/2018 | Littlejohn et al. | |
| 10,255,802 | B2 | 4/2019 | Littlejohn et al. | |
| 10,692,366 | B2 | 6/2020 | Littlejohn et al. | |
| 11,138,871 | B2 | 10/2021 | Littlejohn et al. | |
| 11,735,036 | B2 * | 8/2023 | Littlejohn | G08G 1/0125 701/119 |
| 2002/0141491 | A1 | 10/2002 | Corts et al. | |
| 2008/0275629 | A1 | 11/2008 | Yun | |
| 2009/0125219 | A1 | 5/2009 | Lee et al. | |
| 2010/0114465 | A1 | 5/2010 | Kim et al. | |
| 2013/0328941 | A1 | 12/2013 | Carbonneau et al. | |
| 2017/0061792 | A1 | 3/2017 | Dang et al. | |
| 2017/0243485 | A1 | 8/2017 | Rubin et al. | |
| 2017/0345293 | A1 | 11/2017 | Littlejohn et al. | |
| 2018/0204448 | A1 | 7/2018 | Littlejohn et al. | |
| 2018/0365985 | A1 | 12/2018 | Littlejohn et al. | |
| 2018/0375677 | A1 | 12/2018 | Deshpande et al. | |
| 2019/0197884 | A1 | 6/2019 | Littlejohn et al. | |
| 2020/0219385 | A1 | 7/2020 | Littlejohn et al. | |
| 2022/0028256 | A1 | 1/2022 | Littlejohn et al. | |

OTHER PUBLICATIONS

Mangharam et al., Bounded-Latency Alerts in Vehicular Networks, 2007, IEEE, p. 55-60 (Year: 2007).*
Taysi et al., Routing Protocols for GeoNet: A Survey, 2012, IEEE, p. 939-954 (Year: 2012).*
Aezladen et al., Efficient Location-Based Decision-Supporting Content Distribution to Mobile Groups, 2012, IEEE, p. 1514-1526 (Year: 2012).*
Berlin et al., Direction based Hazard Routing Protocol (DH RP) for disseminating road hazard information using road side infrastructures in VANETs, 2014, Internet, p. 1-17.
Burfeind, Mark; INRIX TPEG Connect "Optimizes Delivery and Reduces Costs of Providing Dynamic Traffic Info to Connected Vehicles and Devices"; Jul. 28, 2010, 2 pages, http:f/inrix.c:om/press/2656/.
Chen et al., Broadcasting safety information in vehicular networks: issues and approaches, 2010, IEEE, p. 20-25.
Chisalita et al., A context-based vehicular communication protocol, 2004, IEEE, p. 2820-2824 (Year: 2004).
Cho et al., An efficient transmission of traffic and traveler information using digital multimedia broadcasting network, :2005, IEEE, p. 2749-2752 (Year: 2005).
Cho et al., Real Time Traffic Information Service Using Terrestrial Digital Multimedia Broadcasting System, 2006, EEE, p. 550-556 (Year: 2006).
Cui el al., Extraction of traffic information from social media interactions: Methods and experiments, 2014, IEEE, p. 1549-1554 (2014).
Dressier et al., Requirements and objectives for secure Traffic Information Systems, 2008, IEEE, p. 808-814.
Francis, Dave, TISA-building standards in Automotive Traffic Information Services, Taiwan Telematics 2012, Nov. 8, 2012, 34 pages.
Francis, Dave; TPEG Digital Radio Traffic Data, Next generation of Traffic and Travel Information Services; May 3, 2016; 23 pages.
Gardiner, P.A.O.; Implementing TPEG and Multimedia Services for Digital Radio, British Broadcasting Corporation. JK, Dec. 1999; 6 pages.
Jeong et al., A novel TPEG application for location based service using terrestrial-DMB. 2006, IEEE, p. 281-286 (2006).
Jiang et al., Research on Accessibility pattern of China at City Level Based on Land Traffic Networtc:, 2011, IEEE, p. 187-191 (2011).
Lin et al .. Fountain coding for efficientTPEG data reception on data carousel transmission, 2009, IEEE. p. 486-491 Year: 2009.
Lopez, Telematic services for interactive traffic information: the Spanish case, 1995, IEEE, p. 224-228 (Year: 1995).
Mangharam et al., Bounded-Latency Alerts in Vehicular Networtc:s, 2007, IEEE, p. 55-60 (Year: 2007).
Marks. Bev. TPEG—an introduction to the growing family of standards and specifications for fraffic and Travel Information services, Jun. 10, 2009, 53 pages.
Nzouonla et al., VAN ET Routing on City Roads Using Real-Time Vehicular Traffic Information, 2009, IEEE. p. 3609-3626 (Year: 2009).
Pocovi et al. Automation for On-Road Vehicles: Use Cases and Requirements for Radio Design, 2015, IEEE, p. 1-5 (2015).
Schneebauer el al., On-The-Fty Location Referencing Methods for Establishing Traffic Information Services, 2007, IEEE, p. 14-21 (2007).
TPEG Analyser (Nov. 2015). Retrieved from http://wecantpeg.com/tpeg-analyser.html; 4 pages.
Unbehaun et al., Broadcasting Traffic Information over Bursty Channels, 2006, IEEE, p. 1-6 (Year: 2006).
Wanichayapong et al., Social-based traffic information extraction and classification, 2011, IEEE, pg. (Year: 2011).
We Can TPEG! (Oct. 2015). Retrieved from http://wecantpeg.com/TPEG_Analyser_ 4_ 1.pdf; 2 pages.
Yang et al. A real-time road traffic information system based on a peer-to-peer approach, 2008, IEEE, 513-518.
Barros et al., Short-term real-time traffic prediction methods: A survey, 2015, IEEE, p. 132-139 (Year: 2015).
Djahel et al., A Communications-Oriented Perspective on Traffic Management Systems for Smart Cities: Challenges and Innovative Approaches, 2014, IEEE, p. 125-151 (Year: 2014).
Araghi et al., A comparative study of k-NN and hazard-based models for incident duration prediction, 2014, IEEE, p. 1608-1613 ( Year: 2014).

* cited by examiner

SELECTIVE INCLUSION OF DATA IN TRANSPORT PROTOCOL EXPERT GROUP FRAMES

CROSS REFERENCE TO RELATED PATENTS

The present U.S. Utility Patent Application claims priority pursuant to 35 U.S.C. § 120 as a continuation of U.S. Utility application Ser. No. 18/217,700, entitled, "CONDITIONAL INSERTION OF CHANGED TRAFFIC DATA INTO THE PREVIOUS TRAFFIC FRAME," filed Jul. 3, 2024, which is a continuation of U.S. Utility application Ser. No. 17/492,762, entitled "TIME-BASED ADJUSTMENT OF BOUNDING AREA DEFINITIONS," filed Oct. 4, 2021, which is a continuation of U.S. Utility application Ser. No. 16/819,312, entitled "CREATING TRANSPORT PROTOCOL EXPERTS GROUP FRAMES," filed Mar. 16, 2020, now U.S. Pat. No. 11,138,871 issued on Oct. 5, 2021, which is a continuation of U.S. Utility application Ser. No. 16/288,822, entitled "SERVER-BASED SYSTEM FOR PRIMARY BOUNDING AREA TRANSPORT PROTOCOL EXPERTS GROUP FRAMES," filed Feb. 28, 2019, now U.S. Pat. No. 10,692,366 issued on Jun. 23, 2020, which is a continuation of U.S. Utility application Ser. No. 16/110,539, entitled "SERVER-BASED SYSTEM FOR PRIMARY BOUNDING AREA TRANSPORT PROTOCOL EXPERTS GROUP FRAMES," filed Aug. 23, 2018, now U.S. Pat. No. 10,255,802 issued on Apr. 9, 2019, which is a continuation of U.S. Utility application Ser. No. 15/917,934, entitled "PRIMARY BOUNDING AREA TRANSPORT PROTOCOL EXPERTS GROUP FRAMES," filed Mar. 12, 2018, now U.S. Pat. No. 10,089,866 issued on Oct. 2, 2018, which is a continuation of U.S. Utility application Ser. No. 15/162,951 entitled "BROADCAST TRAFFIC INFORMATION BOUNDING AREAS," filed May 24, 2016, now U.S. Pat. No. 9,916,756 issued on Mar. 13, 2018, all of which are hereby incorporated herein by reference in their entirety and made part of the present U.S. Utility Patent Application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to traffic information, and more particularly to conditionally inserting changed traffic data into a previous traffic frame.

2. Description of Related Art

Traffic information can be collected and transmitted to users via a packet switched network using Transport Protocol Experts Group (TPEG) frames, such as the Internet; by broadcasting Radio Data System (RDS) data; or using in-band-on-channel (IBOC) techniques, including digital audio broadcast (DAB) and HD™ radio broadcasts. Various IBOC techniques can be used to broadcast Transport Protocol Experts Group (TPEG) frames.

Current HD™ standards or implementations provide limited bandwidth for transmitting traffic information and other data. This limited bandwidth restricts the size of the payload that can be reliably delivered to vehicles in a broadcast area, and makes it difficult to expand traffic flow coverage to smaller roads, such as surface streets, in the broadcast area of large metropolitan areas. The inclusion of these smaller roads can be desirable to provide a better user experience for drivers and accurate time to destination.

Conventional systems define a single bounding area for each broadcast area, and that single bounding area is used to determine which sets of roads to include within broadcast TPEG frames within any given broadcast area. Use of a single bounding area can restrict coverage to only larger roads, which does not include most surface level streets. However, including traffic information for all of the smaller roads across the entire broadcast area can result in an increase in the amount of traffic data, and can cause the size of a TPEG frame payload to exceed size limitations imposed by current practices.

In view of the above, it is apparent that currently available technologies are less than perfect.

BRIEF SUMMARY OF THE INVENTION

The present invention is directed to apparatus and methods of operation that are further described in the following Brief Description of the Drawings, the Detailed Description of the Invention, and the claims. Various features and advantages of the present invention will become apparent from the following detailed description of the invention made with reference to the accompanying drawings.

BRIEF DESCRIPTION OF THE SEVERAL VIEWS OF THE DRAWING(S)

Figure 4:
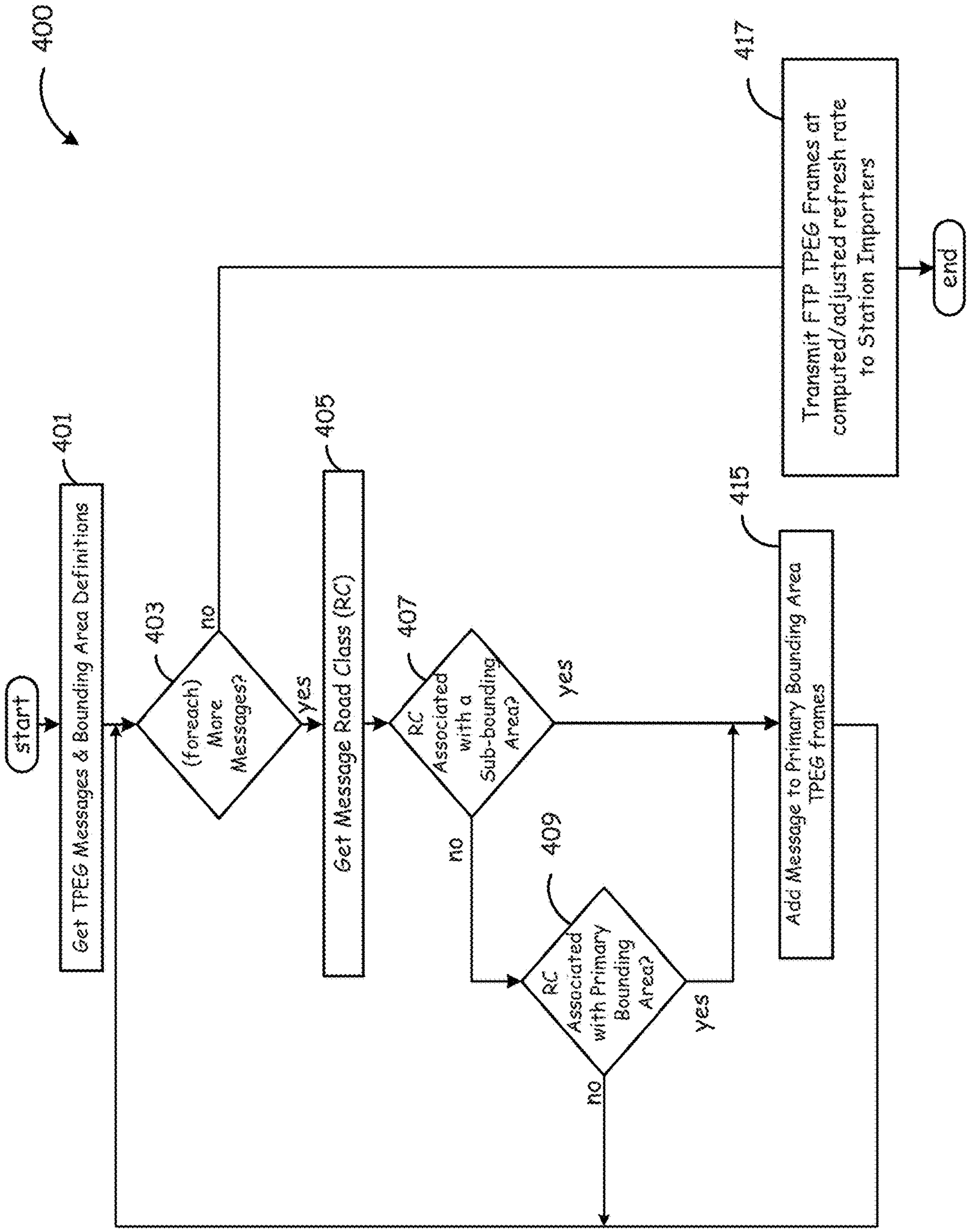
Figure 5:
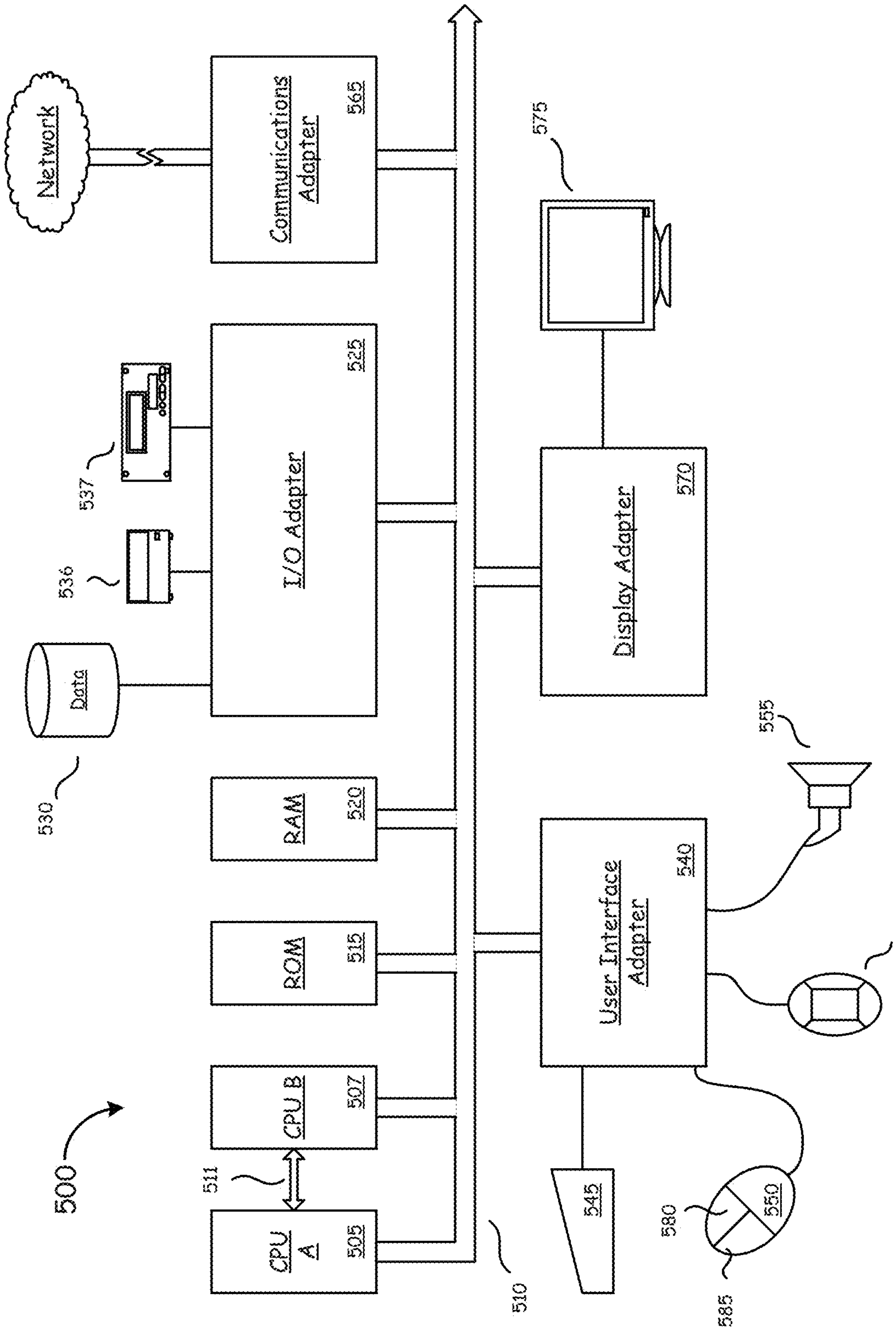

FIG. 4 is a flowchart illustrating a method of processing Transport Protocol Experts Group (TPEG) messages for individual incidents or roads into a TPEG frame for broadcast to a primary bounding area, in accordance with various embodiments of the present disclosure; and FIG. 5 is a high-level block diagram of a processing system, part or all of which can be used to implement various servers, machines, devices, and systems, in accordance with various embodiments of the present disclosure.

DETAILED DESCRIPTION OF THE INVENTION

In various embodiments discussed herein, the different road classifications can be associated with one or more sub-bounding areas that are part of a larger primary bounding area. The primary bounding area can correspond roughly with a broadcast area associated with a particular broadcast market, and can be associated with one or more road classifications, usually road classifications associated with larger roads such as freeways and other main traffic arteries. Traffic information associated with these larger roads located within the primary bounding area can be inserted into a traffic frame broadcast throughout the entire broadcast area corresponding to the primary bounding area.

In various embodiments, the primary bounding area can be divided into sub-bounding areas in which traffic information for smaller roads is deemed to be desirable or necessary for accurate representation of traffic, estimated travel times, or the like. Each of these sub-bounding areas can be associated with higher class, e.g. smaller, roads. Traffic information for portions of smaller roads located within a sub-bounding area can be included in the same frame as the traffic information for the larger roads. In effect, traffic information for substantially all large roads in a broadcast area can be included in a traffic frame, while limiting the amount of traffic information for smaller roads in the traffic frame to only those smaller roads located in particular sub-bounding areas. In this way, the overall size of a traffic frame can be kept small enough to fit within a standardized traffic frame, for example a Transport Protocol Experts Group (TPEG) frame transmitted via HD™ radio, but still include information about both larger roads and "important" smaller roads.

Multiple different sub-bounding areas, each having different road classification associations, can be included in a primary bounding area in various embodiments, thereby providing large area support for larger roads, such as interstates and major highways, and targeted area support for smaller roads within a particular portion of a broadcast area.

In various embodiments, the refresh rate of information included in a traffic frame can be automatically adjusted if the system detects that the payload size is approaching a payload threshold limit. For example, in some embodiments traffic information inserted into a traffic frame can be limited to changed information. By refreshing the information for larger roads more often than the information for smaller roads, the size of a traffic frame payload can be reduced beyond the reduction in payload size achieved by using multiple configurable sub-bounding areas.

The road classification convention referred to herein can assign the smallest number to the largest/most important roads, and the largest number to the smallest/least important roads, so a lower class road is usually larger than a higher class road, unless a smaller road has been assigned a lower number based on its importance to traffic flow or volume. For example, highways might be assigned to road class zero, while small residential streets might be assigned to road class nine. Other classification systems can also be used without departing from the spirit and scope of the present disclosure. For example, the Federal Highway Administration (FHWA) Bureau of Indian Affairs (BIA) Indian Reservation Roads (IRR) program uses a classification from 1-7, where major arterial roads are assigned to class 1, rural minor arterial roads are assigned to class 2, city local roads are assigned to class 3, rural major collector roads are assigned to class 4, rural local roads are assigned to class 5, city minor arterial streets are assigned to class 6, and city collector streets are assigned to class 7. Some implementations may assign lower classifications to smaller roads and higher classifications to smaller roads, but the principles described herein can still be applied in those cases.

Figure 1:
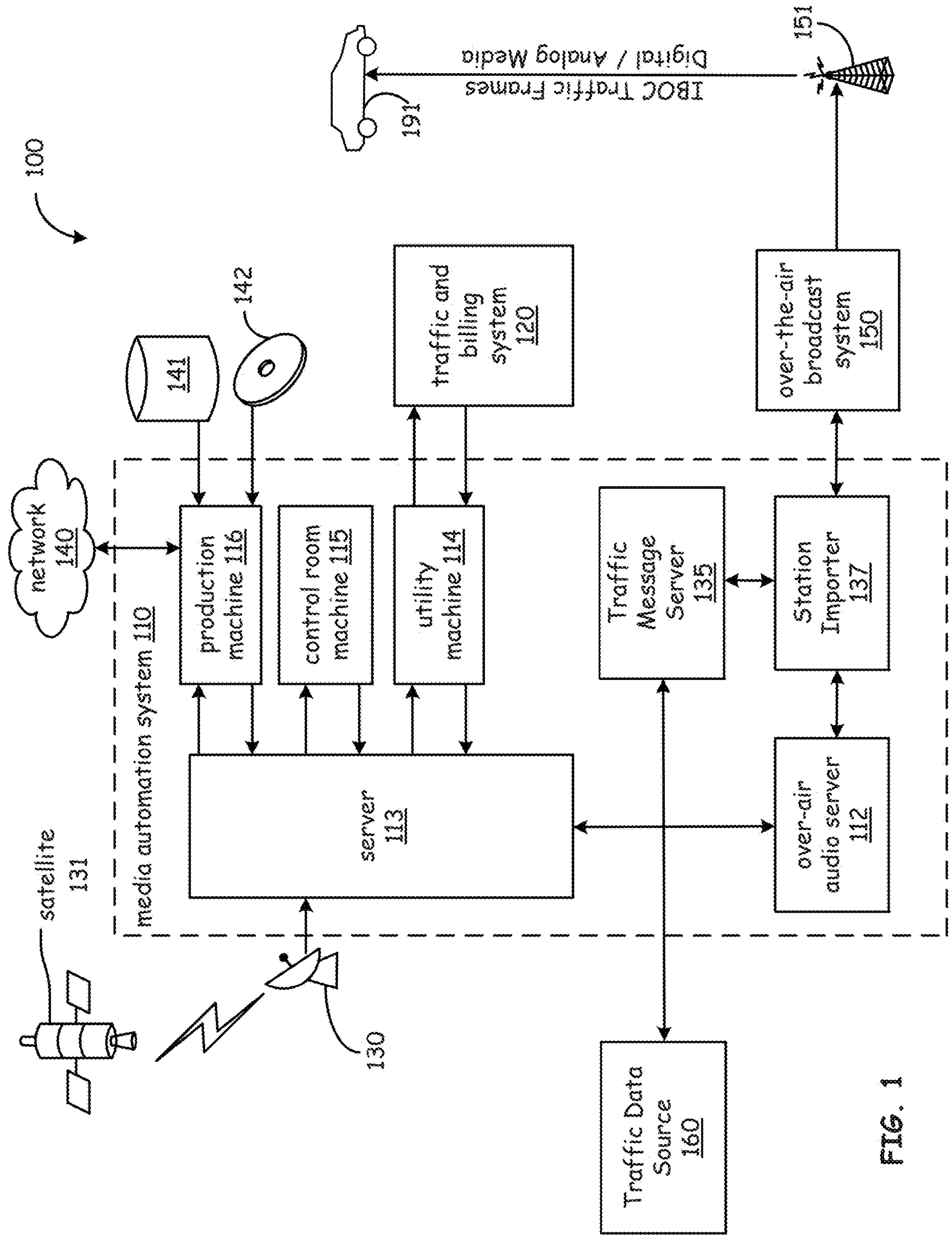
FIG. 1 is a schematic block diagram of a broadcasting system in accordance with various embodiments of the present disclosure.

Referring first to FIG. 1, a system 100 will be discussed according to various embodiments of the present disclosure. As illustrated, system 100 media automation system 110, for example a NexGen® automation system, which can control and automate various media broadcast functions; and traffic and billing system 120, for example a Viero® traffic system, which can provide control for various traffic and billing functions such as entering and editing orders, and scheduling spots. It should be noted that the word "traffic," as used in conjunction with traffic and billing system 120 does not refer to vehicular traffic or mobility, but is a term of art referring to the scheduling and availability of programming and advertising material.

In general, traffic and billing system 120 can be used to provide control and monitoring of the sale and scheduling of spot blocks containing one or more spots for multiple different media stations, although only a single station is illustrated, and to determine which spot blocks are to be played on which broadcast stations at particular times. This information can be provided to server 113 in the form of a log file in some embodiments. Media automation system 110 can use server 113 to gather programming and media information from various sources, and combine that information with spot block information to generate a log file indicating a substantially complete representation of which media and spots are to be broadcast. The log file and related information can be provided to over-air audio server 112, and to a streaming audio server (not illustrated) for broadcast over their respective systems.

Media automation system 110, as illustrated, can also include production machine 116, which can obtain information from broadcasts in other markets via network 140. Production machine 116 can also obtain media from database 141, which may be a database local to production machine 116, or local to another server or machine that is part of media automation system 110. In other embodiments database 141 can be maintained by a third-party media provider, which can be remote from media automation system 110. Production machine 116 can also obtain media to be broadcast from individual media sources, such individual source media 142, which may include any of various non-volatile media storage elements, including but not limited to optical disks, e.g. compact discs (CDs), digital video disks (DVDs), various types of magnetic and electromagnetic storage media, or the like.

Production machine 116 can provide some or all of the media to be broadcast to server 113. In addition to the media provided to server 113 from production machine 116, satellite receiver 130 can also provide satellite content from satellite 131 to be inserted into a broadcast via over-air audio server 112. Server 113 can also receive media or other content to be broadcast from control room machine 115. Control room machine 115 may include a studio in which a live broadcast is being generated, such as a talk show or other similar live program, but control room machine 115 can also provide media to server 113 other than live media.

Additionally, control room machine 115 can provide server 113 with various control functions, and in some cases an operator can manually add or remove spots, programming, and other content that server 113 has previously slotted for broadcast. Thus, for example, an operator in control room machine 115 may determine that a previously scheduled spot in a particular spot block is not to be broadcast for any of various reasons. Upon making that determination, control room machine 115 can be used to send a signal to server 113. In response to the signal, server 113 can remove the spot from its previously scheduled spot block. In some embodiments, the removed, or "bumped" spot is not delivered to over-air audio server 112 for over-the-air broadcast.

Traffic and billing system 120 is, in some embodiments, connected to server 113 via a utility machine 114, which can be a processing device configured to provide user access to traffic and billing system 120, access to various combination of one or more functions or services provided by other machines, such as control room machine 115 and production machine 116, to provide user access to server 113, or some combination thereof. In at least one embodiment utility machine 114 can be specifically configured to act as a proxy between traffic and billing system 120 and one or more other machines included in media automation system 110. In other embodiments, traffic and billing system may be connected to server 113 through other machines, for example a control room machine 115, production machine 116, or directly connected to server 113. In other embodiments, traffic and billing system 120 and server 113 can be included in a single machine, or collection of machines that are co-located or connected in a distributed fashion. In yet further embodiments, traffic and billing system 120 can include local instances or subsystems associated with one or more media stations, and a backend subsystem used to provide centralized control or services to each of the local instances or subsystems.

Media automation system 110 can also include over-air audio server 112, which provides media content to over-the-air broadcast system 150 via station importer 137, or directly (not explicitly illustrated). Server 113 can provide audio, images, video, or mixed media content to over-air audio server 112. Note that even though an audio server is illustrated and discussed, the techniques and principles described herein can also be applied to images, video and mixed media content.

System 100 can also include Traffic Data Source 160, traffic message server 135, and station importer 137. In various embodiments, traffic message server 135 receives traffic messages from Traffic Data Source 160, combines the traffic messages into a traffic frame using bounding area information, and transmits the traffic frame to station importer 137. Station importer 137 refers generally to a processing system used to: 1) create separate streams for different HD™ channels (e.g. HD2 and HD3 stations), and 2) package and multiplex data into an HD™ radio signal transmitted by over-the-air broadcast system 150. Although illustrated as an intermediary between over-air audio server 112 and over-the-air broadcast system 150, station importer 137 can, in some embodiments (not explicitly illustrated), be part of over-the-air broadcast system 150, or perform at least the data packaging and data multiplexing at or near the point at which over-the-air broadcast system 150 transmits media and advertising content to broadcast tower 151. In at least one embodiment, broadcast tower 151 transmits, to automotive radio system 191, digital and/or analog media content and IBOC Traffic Frames received from over-the-air broadcast system 150.

The terms traffic frame and traffic message are sometimes used interchangeably herein, and refer to the fact that a traffic frame, such as a TPEG frame, included in an HD™ broadcast to automotive radio system 191 is, in a broad sense, a "message" that includes traffic information. However, in other instances the term "traffic message" is used to refer to traffic information relating to particular traffic incidents and/or locations, which is received from Traffic Data Source 160, or generated by Traffic Message server 135 based on raw or partially processed data received from Traffic Data Source 160. In some such cases, one or more "traffic messages" are incorporated into a "traffic frame" or a "TPEG frame." General reference to a "traffic message" should be understood to include a traffic frame, unless the context dictates that the narrower meaning of "traffic message" is to be applied.

Various system configurations can be used to implement the teachings set forth herein, and are not limited to the exact configurations discussed with reference to FIG. 1. For example, although at least one embodiment includes separate traffic and billing systems, similar functionality can be provided using a single, integrated system, or a system having one or more local or distributed processing, storage and communication elements. Thus, although embodiments including automation and traffic systems are primarily discussed herein, other embodiments can be implemented without the need for cooperation between separate automation and traffic systems.

In at least one embodiment, one or more of the illustrated servers and/or machines can be realized as a virtual server or machine implemented on the same hardware as another of the illustrated servers or machines. In each case, however, implementation of a server requires the use of hardware, and general reference to a "server," unless otherwise explicitly stated or required by the context, includes hardware components used to implement the server functionality. Additionally, various distributed processing techniques can be used to spread functionality of one or more of the illustrated servers across multiple different machines.

Figure 2:
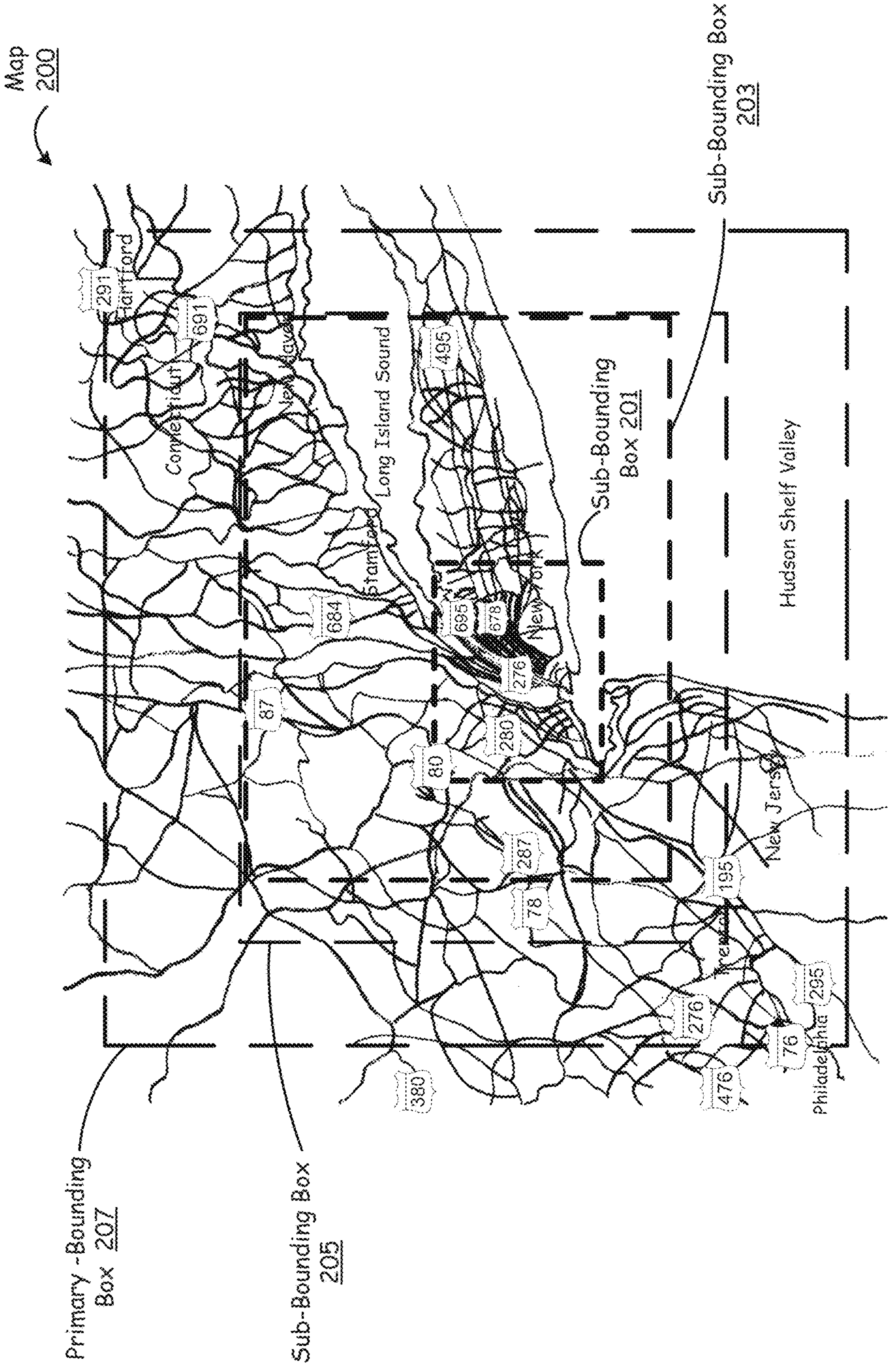
FIG. 2 is a map illustrating a primary bounding area and multiple sub-bounding areas, in accordance with various embodiments of the present disclosure.

Referring next to FIG. 2 is a map 200 illustrating a primary bounding area and multiple sub-bounding areas will be discussed in accordance with various embodiments of the present disclosure. Map 200 is a road map illustrating roads in a broadcast area surrounding and including New York City. The broadcast area represented by the entire map 200 corresponds generally to a primary bounding area defined by primary-bounding box 207. Within primary-bounding box 207 there can be multiple sub-bounding areas defined by sub-bounding boxes 201, 203, and 205. In the illustrated embodiment, sub-bounding box 205 lies entirely within primary-bounding box 207; sub-bounding box 203 lies entirely within sub-bounding box 205; and sub-bounding box 201 lies entirely within sub-bounding box 203. In some embodiments, the sub-bounding boxes 201, 203, and 205 need not be nested, but can instead cover various different portions of a primary bounding area defined by primary-bounding box 207, with or without overlap.

It will be appreciated that in practice, broadcast transmission areas do not actually conform neatly to exact geometric shapes, so statements that a broadcast area corresponds to a bounding area, should not be interpreted as requiring an exact correspondence, but rather a correspondence one of ordinary skill in the art would consider reasonable and customary. It should also be understood that primary-bounding box 207 and sub-bounding boxes 201, 203, and 205, need not be literal "boxes" but can include various different polygons, circles, ovals, or other suitable regular or irregular closed shapes. In addition, different bounding areas can have different shapes. For example, sub-bounding box 203 can be circular, sub-bounding box 205 can be hexagonal, and sub-bounding box 201 can match the boundaries of the official city limits of New York City.

In an example of operation, a media station broadcasts primary content, such as songs, shows, or video content, advertisements, and traffic messages (frames) throughout a broadcast area corresponding to primary-bounding box 207. The traffic information included in the broadcast traffic frame can include traffic information selected based on one or more road classifications associated with primary-bounding box 207, sub-bounding box 205, sub-bounding box 203, and sub-bounding box 201. In general, a traffic message can include information indicating a road's classification and location. The information associated with a road's location can be used to determine whether or not the traffic message is related to a road within a particular bounding area. The road's classification can be compared to any road classifications associated with the bounding area in question. Matching information is included, or excluded depending on the implementation, from the media station's broadcast.

Primary-bounding box 207 can be associated with, for example, road classification 0 (the largest roads). This means that traffic information for any class 0 roads located within the primary-bounding area defined by primary-bounding box 207 will be included in the broadcast. In general, reference to a road being within a bounding area does not require the entire road to be located within the bounding area, only a portion. Likewise, reference to traffic information associated with a road located within a bounding area refers to traffic information related to portions of the road within the bounding area.

Continuing with the present example, sub-bounding box 205 can be associated with road classes 1 and 2, sub-bounding box 203 can be associated with class 3 roads, and sub-bounding box 201 can be associated with road classifications 4-7. Keeping in mind that the sub-bounding areas are nested in this example, a traffic frame broadcast throughout the broadcast area can include traffic information for: 1) class 0-7 roads within sub-bounding box 201; 2) class 0-3 roads within sub-bounding box 203 but outside of sub-bounding box 201; 3) class 0-2 roads within sub-bounding box 205 but outside of sub-bounding box 203; and class 0 roads within primary-bounding box 207 but outside of sub-bounding box 205.

Considered from an inclusionary perspective, in various embodiments traffic information for the following road classes can be included in traffic frames broadcast throughout the primary bounding area: class 0 roads located inside primary-bounding box 207, class 1-2 roads located inside sub-bounding box 205; class 3 roads located inside sub-bounding box 203; and class 4-7 roads located inside sub-bounding area 201.

Considered from an exclusionary perspective, in various embodiments traffic information for the following road classes can be excluded from traffic frames broadcast throughout the primary bounding area: class 1 through class n roads located outside of sub-bounding box 205, class 2 through class n roads located outside of sub-bounding box 203; class 4 through class n roads located outside of sub-bounding box 201; and all traffic information for roads assigned to a class higher than class 8.

Figure 3:
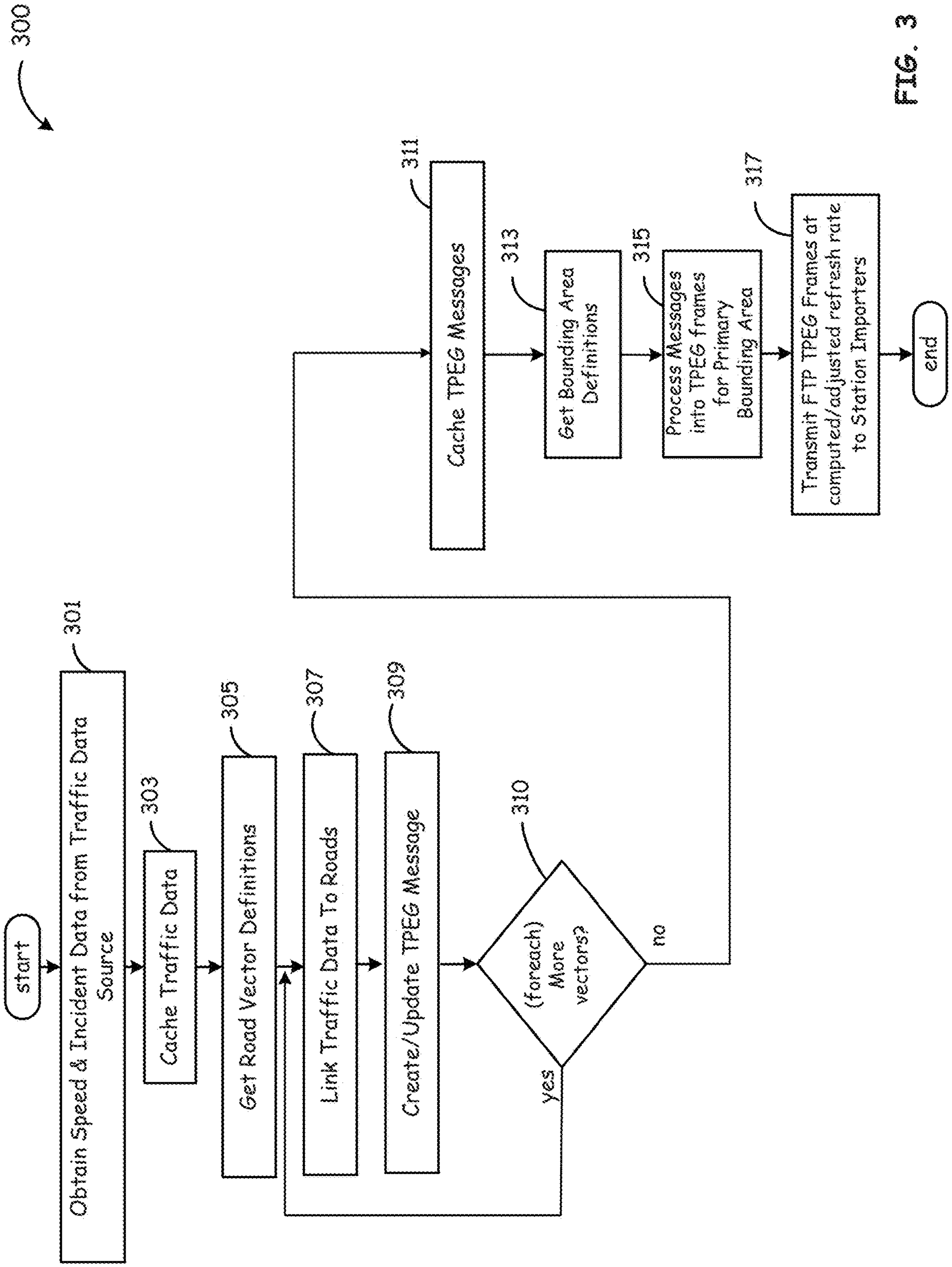
FIG. 3 is a flowchart illustrating a method of generating a Transport Protocol Experts Group (TPEG) frame, in accordance with various embodiments of the present disclosure.

Referring next to FIG. 3 is a flowchart illustrating a method 300 of generating a Transport Protocol Experts Group (TPEG) frame that includes traffic information for selected roads within a broadcast area, in accordance with various embodiments of the present disclosure.

As illustrated at block 301, a traffic information server, such as traffic message server 135 (FIG. 1) can receive traffic information from a traffic data source, such as Traffic Data Source 160 (FIG. 1). Traffic information received from the traffic data source can include, but is not limited to, incident location, traffic flow information, such as traffic speed; incident information, such as accidents, stalls, clearing of accidents, accident severity, and the like; road closure and construction information, suggested alternate routes, or some combination thereof. The traffic information can be received in the form of a dedicated traffic message, or in conjunction with other types of information directly or indirectly from a traffic data provider. A single traffic message received from a data source can include information related to one or more individual traffic incidents, one or more roads, one or more road classes, or the like.

In at least one embodiment, a traffic message can include traffic incident data such as an Incident Identifier, a starting and ending latitude and longitude of an incident, a start time, and end time, a last modified time, an incident type an incident severity, a road-closure indicator, a verification indicator, lane information, congestion information, and other similar information. In at least one embodiment, an Incident Identifier can include a unique identifier, for example a numerical or alphanumerical identifier, used to distinguish one traffic incident from another. Consider, for example, a first incident in which a tractor-trailer is jack-knifed, and is blocking the right two lanes of a highway, and second incident in which a stalled car is blocking an onramp to that same freeway approximately 1 mile later. In some embodiments, the tractor-trailer can be assigned one incident number, and the stalled car can be assigned a second incident number.

As illustrated at block 303, a traffic information server can store all, or some portion of the traffic information included in memory for later processing into a TPEG frame. As illustrated by block 305, road vector definitions can be obtained. In some embodiments, road vector definitions can be obtained only for roads identified in traffic data received from a traffic data source. In other embodiments road vector definitions can be obtained for all roads in a particular broadcast area in advance, and stored in a road vector database for future use. In some embodiments, road vector data can be obtained from a traffic data source in addition to obtaining traffic information. Road vector definitions can include road classification data, and information that permits a correlation between a road and longitude and latitude coordinates.

As illustrated by block 307, traffic information can be linked to particular roads by associating the road vector definitions with longitude and latitude data, or other location identification data, included in the traffic information. As illustrated by block 309, a TPEG message including the traffic information plus information indicating one or more roads associated with the traffic information can be created or updated. In various embodiments, the first time block 309 is executed for each piece of traffic information, the TPEG message can be created. As additional roads are associated with each incident at block 307, the TPEG message can be updated at block 309 to include information linking the additional roads to the traffic information.

As illustrated by block 310, a check is performed to determine if there are additional road vectors to be associated with the traffic information. If so, method 300 returns to block 307. If there are no additional road vectors to be associated with a particular traffic incident or other piece of traffic data, method 300 caches the TPEG message, as illustrated at block 311.

In some embodiments, blocks 307, 309, and 310 are configured to perform similar functions, but on a per-road vector basis rather than on a per-traffic incident/item basis. Thus, rather than generating a single TPEG message per incident, a single TPEG message can be generated per road vector. For example, a traffic incident that involves two roads can be expressed as two TPEG messages, with one TPEG message being associated with each road vector. This is in contrast to the illustrated embodiment, in which a traffic incident involving multiple roads can result in a single TPEG message associated with multiple roads. In a similar manner, when operating on a per-road vector basis, multiple traffic incidents associated with a particular road can be included in a single TPEG message, while the illustrated embodiment can generate multiple TPEG messages for a single road.

As illustrated at block 313, bounding area definitions can be obtained. The bounding area definitions include information associating various road classes, or classifications, with primary bounding areas and sub-bounding areas. The bounding area definitions can include locational definitions that define boundary edges, and road classification information indicating which road classes are associated for inclusion in, or exclusion from, one or more particular bounding areas. In at least one embodiment, bounding area definitions can be obtained from a local media automation system, from an external database associated with an advertiser, from over-the-air broadcast system 150 (FIG. 1), or the like.

In various embodiments, the bounding area definitions can be automatically adjusted, for example by traffic message server 135 (FIG. 1), based on a time of day, time of year, or the like. For example, a particular sub-bounding area can be defined to include only road classes 0 during a morning rush hour, but can be defined to include road classes 0-3 from midnight to 5 am.

As illustrated by block 315, the TPEG messages cached at block 311 can be combined into a composite, or aggregate, TPEG frame using the bounding area definitions obtained at block 313. Generation of the TPEG frame will be discussed in more detail with reference to FIG. 4. As illustrated at block 317, the TPEG frame generated at block 315 can be transmitted for broadcast, for example by transmitting the TPEG frame to a station importer 137 (FIG. 1), via file transfer protocol (FTP). The station importer can then insert the TPEG frame into an HD™ radio broadcast. In various embodiments, the TPEG frame is broadcast for reception in a primary bounding area, and includes traffic information for selected roads based on road's class, and on the road classifications associated with a primary bounding area and one or more sub-bounding areas.

Referring next to FIG. 4 a method 400 of processing Transport Protocol Experts Group (TPEG) messages for individual incidents or roads into a TPEG frame for broadcast to a primary bounding area, in accordance with various embodiments of the present disclosure. As illustrated at block 401, TPEG messages and bounding area definitions can be obtained. Block 401 can be performed, in at least some embodiments, as illustrated by blocks 301-313 of FIG. 3.

As illustrated at block 403, a check can be made to determine whether there are TPEG messages remaining to be processed into TPEG frames. If there are no additional TPEG messages to be processed into TPEG frames, any already processed TPEG frames can be delivered to a station importer, as illustrated at block 417. If there are TPEG messages to be processed into TPEG frames, method 400 can proceed to block 405.

As illustrated by block 405, one or more road classes associated with the message can be determined. In some embodiments, a road class associated with a message can be determined based on information included in the TPEG message. For example, information inserted by message server 135 (FIG. 1) can include a road classification associated with a road associated with the traffic message. In other embodiments, traffic message server 135 (FIG. 1) can maintain a list of road classes associated with TPEG messages as those TPEG messages are generated. A road can be considered to be associated with a traffic message if the traffic message includes information linking the road to traffic information included in the message.

As illustrated at block 407, the road class associated with the traffic message can be compared with the sub-bounding area information to determine whether the road classification of the TPEG message matches a road classification associated with one or more sub-bounding areas. For example, consider a traffic incident associated with a road having a road classification of 1. Any TPEG message including information about that traffic incident can be said to have a road class of 1. Using the bounding areas illustrated in FIG. 2 for example purposes, the determination performed at block 407 can return an indication that at least one sub-bounding area definition includes an association with road class 1. Conversely, if the TPEG message has a road classification of 0, the check at block 407 can return an indication that the road class of the TPEG message is not associated with a sub-bounding area, because only the primary bounding area is defined to include an association with road class 0.

If the check at block 407 indicates that a TPEG message has a road class that is associated with at least one sub-bounding area, TPEG message can be added to the TPEG frame, as illustrated by block 415. If the road class of the TPEG message is determined not to be associated with a sub-bounding area at block 407, a check is performed at block 409 to determine if the road class of the TPEG message is associated with a primary bounding area.

If the check performed at block 409 indicates that the road class associated with the TPEG message is not associated with a primary bounding area, method 400 proceeds to block 403, and the next TPEG message can be processed. If, however, the results of block 409 indicate that the road class of the TPEG message is associated with the primary bounding area, the TPEG message can be included in the TPEG frame, as illustrated at block 415.

After adding a TPEG message to a TPEG frame, as illustrated by block 415, method 400 returns to block 403 to check for more messages to process. Once all of the TPEG messages have been processed, and the TPEG frame is complete, the TPEG frame can be transmitted to a station importer, as illustrated at block 417.

Referring now to FIG. 5, a high-level block diagram of a processing system is illustrated and discussed. Processing system 500 includes one or more central processing units, such as CPU A 505 and CPU B 507, which may be conventional microprocessors interconnected with various other units via at least one system bus 510. CPU A 505 and CPU B 507 may be separate cores of an individual, multi-core processor, or individual processors connected via a specialized bus 511. In some embodiments, CPU A 505 or CPU B 507 may be a specialized processor, such as a graphics processor, other co-processor, or the like.

Processing system 500 includes: random access memory (RAM) 520; read-only memory (ROM) 515, wherein the ROM 515 could also be erasable programmable read-only memory (EPROM) or electrically erasable programmable read-only memory (EEPROM); input/output (I/O) adapter 525, for connecting peripheral devices such as disk units 530, optical drive 536, or tape drive 537 to system bus 510; a user interface adapter 540 for connecting keyboard 545, mouse 550, speaker 555, microphone 560, or other user interface devices to system bus 510; communications adapter 565 for connecting processing system 500 to an information network such as the Internet or any of various local area networks, wide area networks, telephone networks, or the like; and display adapter 570 for connecting system bus 510 to a display device such as monitor 575. Mouse 550 has a series of buttons 580, 585 and may be used to control a cursor shown on monitor 575.

It will be understood that processing system 500 may include other suitable data processing systems without departing from the scope of the present disclosure. For example, processing system 500 may include bulk storage and cache memories, which provide temporary storage of at least some program code in order to reduce the number of times code must be retrieved from bulk storage during execution.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or may further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A method, comprising:

establishing a primary bounding area corresponding to a first geographic broadcast area of a traffic message, the primary bounding area associated with a first set of road classes;

establishing a first sub-bounding area nested within the primary bounding area, the first sub-bounding area corresponding to a second geographic area smaller than the first geographic broadcast area, and being associated with a second set of road classes different than the first set of road classes;

receiving a traffic message associated with a road having an assigned road class; and inserting the traffic message into a Transport Protocol Experts Group frame transmitted within the first sub-bounding area in response to determining that the road and the assigned road class are associated with either the first sub-bounding area or the primary bounding area.

2. The method of claim 1, further comprising:

establishing a second sub-bounding area nested within the primary bounding area and lying at least partially outside the first sub-bounding area, the second sub-bounding area corresponding to a third geographic area smaller than the first geographic broadcast area and being associated with a third set of road classes different than the first set of road classes; and inserting the traffic message into a first Transport Protocol Experts Group frame transmitted within the first sub-bounding area and into a second Transport Protocol Experts Group frame transmitted within the second sub-bounding area in response to determining that the road and the assigned road class are associated with both the first sub-bounding area and the second sub-bounding area.

3. The method of claim 1, further comprising:

establishing a plurality of sub-bounding areas nested within the primary bounding area, wherein each of the plurality of sub-bounding areas are associated with sets of road classes that exclude at least one road class included in the first set of road classes; and inserting the traffic message into Transport Protocol Experts Group frames transmitted within each of the plurality of sub-bounding areas in response to determining that the road and the assigned road class are included in the first set of road classes.

4. The method of claim 3, further comprising:

using information indicating a geographic location of the road to determine whether the road is associated with the plurality of sub-bounding areas.

5. The method of claim 1, further comprising:

excluding the traffic message from a particular Transport Protocol Experts Group frame being transmitted throughout the primary bounding area in response to determining that the road or the assigned road class are not associated with the primary bounding area, even if the road and the assigned road class are associated with the first sub-bounding area.

6. The method of claim 1, further comprising:

determining that the road is not associated with the first sub-bounding area in response to the traffic message being associated with a portion of the road located outside the first sub-bounding area.

7. The method of claim 1, further comprising:

obtaining traffic incident data from the traffic message; and wherein inserting the traffic message into a Transport Protocol Experts Group frame includes inserting at least a portion of the traffic incident data into the Transport Protocol Experts Group frame.

8. A processing device, comprising:

a memory configured to store a program of instructions; and a processor coupled to the memory, the processor configured to execute the program of instructions to establish a primary bounding area corresponding to a first geographic broadcast area of a traffic message, the primary bounding area associated with a first set of road classes;

establish a first sub-bounding area nested within the primary bounding area, the first sub-bounding area corresponding to a second geographic area smaller than the first geographic broadcast area, and being associated with a second set of road classes different than the first set of road classes;

receive a traffic message associated with a road having an assigned road class; and insert the traffic message into a Transport Protocol Experts Group frame transmitted within the first sub-bounding area in response to determining that the road and the assigned road class are associated with either the first sub-bounding area or the primary bounding area.

9. The processing device of claim 8, wherein the processor configured to execute the program of instructions to:

establish a second sub-bounding area nested within the primary bounding area and lying at least partially outside the first sub-bounding area, the second sub-bounding area corresponding to a third geographic area smaller than the first geographic broadcast area and being associated with a third set of road classes different than the first set of road classes; and insert the traffic message into a first Transport Protocol Experts Group frame transmitted within the first sub-bounding area and into a second Transport Protocol Experts Group frame transmitted within the second sub-bounding area in response to determining that the road and the assigned road class are associated with both the first sub-bounding area and the second sub-bounding area.

10. The processing device of claim 8, wherein the processor configured to execute the program of instructions to:

establish a plurality of sub-bounding areas nested within the primary bounding area, wherein each of the plurality of sub-bounding areas are associated with sets of road classes that exclude at least one road class included in the first set of road classes; and insert the traffic message into Transport Protocol Experts Group frames transmitted within each of the plurality of sub-bounding areas in response to determining that the road and the assigned road class are included in the first set of road classes.

11. The processing device of claim 10, wherein the processor configured to execute the program of instructions to:

use information indicating a geographic location of the road to determine whether the road is associated with the plurality of sub-bounding areas.

12. The processing device of claim 8, wherein the processor configured to execute the program of instructions to:

exclude the traffic message from a particular Transport Protocol Experts Group frame being transmitted throughout the primary bounding area in response to determining that the road or the assigned road class are not associated with the primary bounding area, even if the road and the assigned road class are associated with the first sub-bounding area.

13. The processing device of claim 8, wherein the processor configured to execute the program of instructions to:

determine that the road is not associated with the first sub-bounding area in response to the traffic message being associated with a portion of the road located outside the first sub-bounding area.

14. The processing device of claim 8, wherein the processor configured to execute the program of instructions to:

obtain traffic incident data from the traffic message; and wherein inserting the traffic message into a Transport Protocol Experts Group frame includes inserting at least a portion of the traffic incident data into the Transport Protocol Experts Group frame.

15. A non-transitory computer readable medium, comprising:

at least one instruction to establish a primary bounding area corresponding to a first geographic broadcast area of a traffic message, the primary bounding area associated with a first set of road classes;

at least one instruction to establish a first sub-bounding area nested within the primary bounding area, the first sub-bounding area corresponding to a second geographic area smaller than the first geographic broadcast area, and being associated with a second set of road classes different than the first set of road classes;

at least one instruction to receive a traffic message associated with a road having an assigned road class; and at least one instruction to insert the traffic message into a Transport Protocol Experts Group frame transmitted within the first sub-bounding area in response to determining that the road and the assigned road class are associated with either the first sub-bounding area or the primary bounding area.

16. The non-transitory computer readable medium of claim 15, further comprising:

at least one instruction to establish a second sub-bounding area nested within the primary bounding area and lying at least partially outside the first sub-bounding area, the second sub-bounding area corresponding to a third geographic area smaller than the first geographic broadcast area and being associated with a third set of road classes different than the first set of road classes; and at least one instruction to insert the traffic message into a first Transport Protocol Experts Group frame transmitted within the first sub-bounding area and into a second Transport Protocol Experts Group frame transmitted within the second sub-bounding area in response to determining that the road and the assigned road class are associated with both the first sub-bounding area and the second sub-bounding area.

17. The non-transitory computer readable medium of claim 15, further comprising:

at least one instruction to establish a plurality of sub-bounding areas nested within the primary bounding area, wherein each of the plurality of sub-bounding areas are associated with sets of road classes that exclude at least one road class included in the first set of road classes; and at least one instruction to insert the traffic message into Transport Protocol Experts Group frames transmitted within each of the plurality of sub-bounding areas in response to determining that the road and the assigned road class are included in the first set of road classes.

18. The non-transitory computer readable medium of claim 15, further comprising:

at least one instruction to exclude the traffic message from a particular Transport Protocol Experts Group frame being transmitted throughout the primary bounding area in response to determining that the road or the assigned road class are not associated with the primary bounding area, even if the road and the assigned road class are associated with the first sub-bounding area.

19. The non-transitory computer readable medium of claim 15, further comprising:

at least one instruction to determine that the road is not associated with the first sub-bounding area in response to the traffic message being associated with a portion of the road located outside the first sub-bounding area.

20. The non-transitory computer readable medium of claim 15, further comprising:

at least one instruction to obtain traffic incident data from the traffic message; and wherein inserting the traffic message into a Transport Protocol Experts Group frame includes inserting at least a portion of the traffic incident data into the Transport Protocol Experts Group frame.

* * * * *